(12) United States Patent
Ozdemir et al.

(10) Patent No.: US 8,693,282 B2
(45) Date of Patent: Apr. 8, 2014

(54) DEGHOSTING SEISMIC DATA

(75) Inventors: Ahmet Kemal Ozdemir, Asker (NO); Bent Andreas Kjellesvig, Oslo (NO); Philippe Bernard Albert Caprioli, Cobham (GB); Philip A. F. Christie, Fen Drayton (GB); Julian Edward (Ed) Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 685 days.

(21) Appl. No.: 12/953,787

(22) Filed: Nov. 24, 2010

(65) Prior Publication Data
US 2011/0292762 A1    Dec. 1, 2011

Related U.S. Application Data

(60) Provisional application No. 61/348,021, filed on May 25, 2010.

(51) Int. Cl.
*G01V 1/38* (2006.01)
*G01V 1/28* (2006.01)

(52) U.S. Cl.
CPC .................... *G01V 1/3808* (2013.01)
USPC ............................ 367/24; 367/21

(58) Field of Classification Search
USPC ..................................... 367/21, 24
See application file for complete search history.

(56) References Cited

U.S. PATENT DOCUMENTS

| 674,913 | A | 5/1901 | Fike |
| 7,676,327 | B2 | 3/2010 | Ozdemir et al. |
| 7,710,821 | B2 | 5/2010 | Robertsson et al. |
| 2003/0028326 | A1 | 2/2003 | Monk et al. |

FOREIGN PATENT DOCUMENTS

WO    2011150126 A2    12/2011

OTHER PUBLICATIONS

International Search Report and Written Opinion of PCT Application No. PCT/US11/038001 dated Feb. 9, 2012.
Amundsen et al., "Rough-sea deghosting of streamer seismic data using pressure gradient approximations," Geophysics, Jan.-Feb. 2005, vol. 70(1): pp. V1-V9.
Posthumus, "Deghosting using a Twin Streamer Configuration," Geophysical Prospecting, 1993, vol. 41: pp. 267-286.

*Primary Examiner* — Ian J Lobo

(57) ABSTRACT

A technique includes receiving seismic data acquired by seismic sensors; and processing the seismic data on a machine to deghost the data. The processing includes deghosting the seismic data using a first deghosting technique that relies on a ghost model; deghosting the seismic data using a second deghosting technique that is independent from any modeling of the ghost; and selectively combining the results of the deghosting using the first and second deghosting techniques.

23 Claims, 6 Drawing Sheets

DEGHOSTING SEISMIC DATA

This application claims the benefit under 35 U.S.C. §119 (e) to U.S. Provisional Patent Application Ser. No. 61/348,021, entitled, "ROBUST DEGHOSTING IN THE PRESENCE OF MODEL UNCERTAINTIES," which was filed on May 25, 2010, and is hereby incorporated by reference in its entirety.

BACKGROUND

The invention generally relates to deghosting seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensor or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving seismic data acquired by seismic sensors; and processing the seismic data on a machine to deghost the data. The processing includes deghosting the seismic data using a first deghosting technique that relies on a ghost model; deghosting the seismic data using a second deghosting technique that is independent from any modeling of the ghost; and selectively combining the results of the deghosting using the first and second deghosting techniques.

Advantages and other features of the invention will become apparent from the following drawing, description and claims.

DETAILED DESCRIPTION

Figure 1:
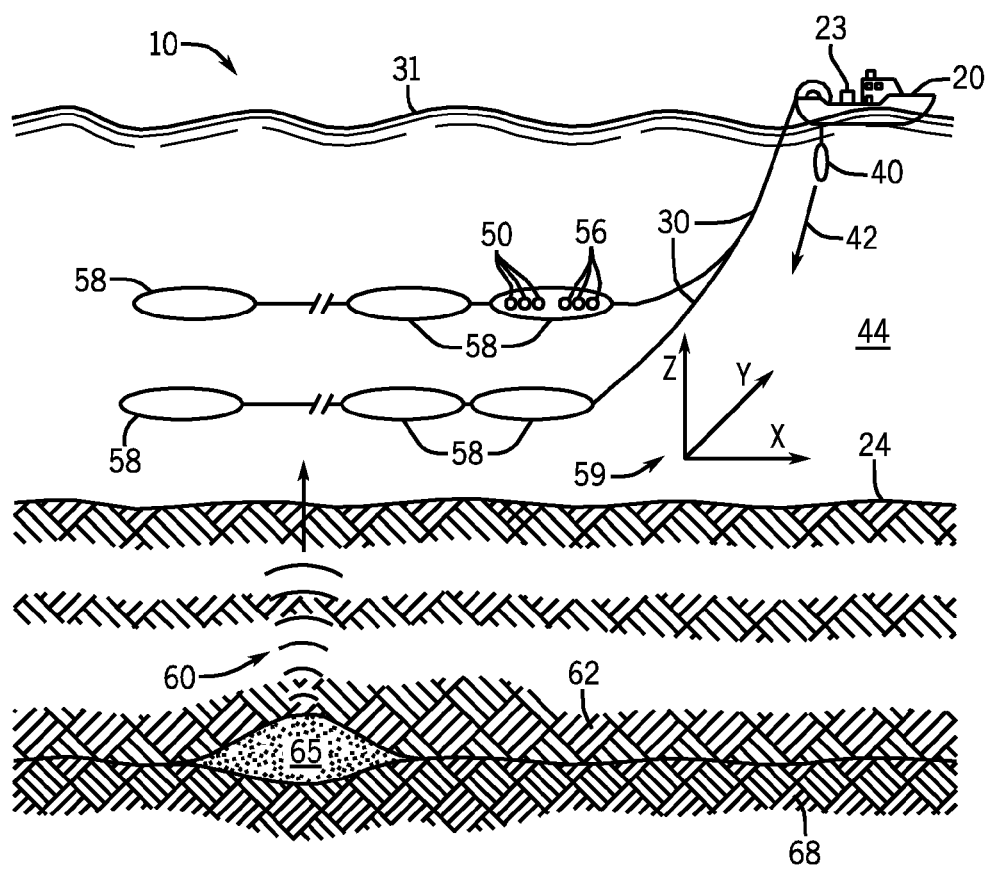
FIG. 1 is a schematic diagram of a marine-based seismic acquisition system according to an embodiment of the invention.

In accordance with embodiments of the invention disclosed herein, a marine-based seismic data acquisition system 10 includes a survey vessel 20, which tows one or more seismic streamers 30 (two exemplary streamers 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers 30 may be towed at multiple depths, such as in an over/under spread, as depicted in FIG. 1.

Each seismic streamer 30 may be several thousand meters long and may contain various support cables (not shown), as well as wiring and/or circuitry (not shown) that may be used to support communication along the streamers 30. In general, the streamer 30 includes a primary cable into which is mounted seismic sensors that record seismic signals.

In accordance with embodiments of the invention, the streamer 30 is a multi-component streamer, which means that the streamer 30 contains particle motion sensors 56 and pressure sensors 50. The pressure 50 and particle motion 56 sensors may be part of a multi-component sensor unit 58. Each pressure sensor 50 is capable of detecting pressure in a propagating seismic wavefield, and each particle motion sensor 56 is capable of detecting at least one component of a particle motion that is associated with the same seismic wavefield that is proximate to the sensor 56. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the streamer 30 may include hydrophones, geophones, particle displacement sensors, particle velocity sensors, accelerometers, pressure gradient sensors, or combinations thereof.

As a non-limiting example, in accordance with some embodiments of the invention, the particle motion sensor 56 measures at least one component of particle motion along a particular sensitive axis 59 (the x, y or z axis, for example). As a more specific example, the particle motion sensor 56 may measure particle velocity along the depth, or z, axis; particle velocity along the crossline, or y, axis; and/or velocity along the inline, or x, axis. Alternatively, in other embodiments of the invention, the particle motion sensor(s) 56 may sense a particle motion other than velocity (an acceleration, for example).

In addition to the streamer(s) 30 and the survey vessel 20, the marine seismic data acquisition system 10 also includes one or more seismic sources 40 (one exemplary seismic source 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, seismic signals 42 (an exemplary seismic signal 42 being depicted in FIG. 1), often referred to as "shots," are produced by the seismic source(s) 40 and expand radially with a vertical component through a water column 44 into strata 62 and 68 beneath a water bottom surface 24. The seismic signals 42 are reflected from the various subterranean geological formations, such as an exemplary formation 65 that is depicted in FIG. 1.

The incident seismic signals 42 that are created by the seismic source(s) 40 produce corresponding reflected seismic signals 60, which propagate through the water as waves with coupled variations in local acoustic pressure and particle motion, and are sensed by the towed seismic sensors. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors generate signals (digital signals, for example), called "traces," which indicate the acquired measurements of the pressure and particle motion wavefields. The traces are recorded and may be at least partially processed by a signal processing unit 23 that is deployed on the survey vessel 20, in accordance with some embodiments of the invention. For example, a particular pressure sensor 50 may provide a trace, which corresponds to a measure of a pressure wavefield by its hydrophone; and a given particle motion sensor 56 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land, on a streamer 30, distributed on several streamers 30, on a vessel other than the vessel 20, etc.

The pressure and particle motion measurements may be combined for purposes of deghosting the measurements to generate data indicative of the deghosted upgoing wavefield. One class of deghosting algorithms comprise those which rely on a ghost model and are generally referred as "ghost model-dependent deghosting algorithms," herein. Another class of deghosting algorithms comprise those which do not rely on ghost models and as such, are referred to as "ghost model-independent deghosting algorithms," herein.

As a non-limiting example, the pressure-particle velocity summation (PZSUM) algorithm is a model-independent deghosting algorithm that uses deterministic weights to combine the pressure and particle motion data. The PZSUM algorithm is generally described in Lasse Amundsen, Tage Rosten, Johan O. A. Robertsson, and Ed Kragh, "On Rough-Sea Deghosting of Single Streamer Seismic Data Using Pressure Gradient Approximations", 70 Geopysics 1 (2005). The PZSUM algorithm is appealing for time-lapse applications, due to its insensitivity to cable depth and its low sensitivity to the rough sea perturbations. However, an underlying assumption with the PZSUM algorithm is that the pressure and particle motion measurements have similar noise levels. This is not necessarily the case, however, at the lower end of the frequency spectrum where the pressure and particle motion measurements may have significantly disparate noise levels. As a result, the accuracy of the PZSUM algorithm may be unacceptable at relatively low frequencies.

The inaccuracies introduced by the streamer noise may be at least partially overcome through the use of a ghost model-dependent deghosting algorithm, such as the "optimal deghosting (ODG) algorithm," which relies on a ghost model to minimize the influence of the streamer noise on the deghosted data. The ODG algorithm is generally described in U.S. Pat. No. 7,676,327, entitled, "METHOD FOR OPTIMAL WAVE FIELD SEPARATION," which issued on Mar. 9, 2010. The ODG algorithm may significantly enhance the signal-to-noise ratio (SNR), as compared to a model-independent deghosting algorithm, such as the PZSUM algorithm. However, the ghost model typically is not entirely accurate, and as such, the use of the ghost model may also introduce inaccuracy, especially at higher frequencies.

Figure 2:
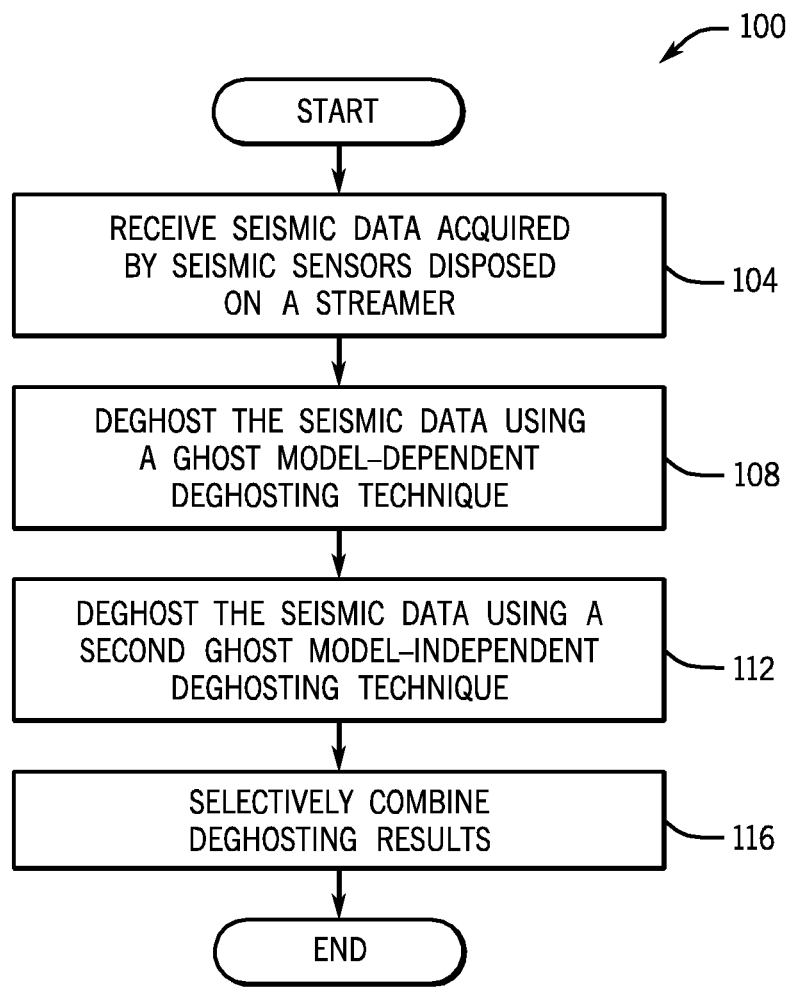
FIGS. 2 and 3 are flow diagrams depicting techniques to deghost seismic data according to embodiments of the invention.

Referring to FIG. 2, a technique 100 that is disclosed herein combines the advantages of both the ghost model-dependent and ghost model-independent deghosting algorithms while avoiding their drawbacks. The technique 100 includes receiving (block 104) seismic data acquired by seismic sensors (i.e., data indicative of particle motion and pressure measurements), which are disposed on the streamer. The technique includes deghosting the seismic data using a first deghosting technique that relies on a ghost model, pursuant to block 108, and also deghosting the seismic data using a second deghosting technique that is independent from any modeling of the ghost, pursuant to block 112. The technique 100 includes selectively combining the results of the deghosting using the first and second deghosting techniques, pursuant to block 116, to provide deghosted data that are not significantly influenced by streamer noise or ghost model errors.

In a specific non-limiting example, the aforementioned model-independent and model-dependent deghosting algorithms are employed to produce two estimates of the deghosted, upgoing wavefield. The balancing of the contributions of these estimated upgoing wavefields to the final estimate is controlled based on the significance of the streamer noise in accordance with some embodiments of the invention. In this regard, for frequencies and wavenumbers in which the streamer noise is strong or expected to be strong, more weight is assigned to the upgoing wavefield estimate produced by the model-dependent deghosting algorithm; and for frequencies and wavenumbers where the streamer noise is relatively weak or expected to be weak, more weight is assigned to the upgoing wavefield estimate produced by the model-independent deghosting algorithm. Moreover, as described below, the balancing of this weighting is optimized and automated to enhance the signal-to-noise ratio and avoid the otherwise footprint of ghost model errors.

Turning now to the more specific details, in general, the seismic sensors on the streamer 30 acquire particle motion measurements (called "Z" herein) and pressure measurements (called "P" herein), which may be described as a function of an upgoing wavefield (called "U"), a downgoing wavefield (called "D"), a pressure noise (called "$N_p$") and a particle motion noise (called "$N_z$"), as set forth below:

$$P = U + D + N_p, \text{ and} \qquad \text{Eq. 1}$$

$$Z = U - D + N_z. \qquad \text{Eq. 2}$$

In Eq. 1, it is assumed that the direct arrival from source to sensor through the water has been removed or, otherwise, the source is below the streamer cable.

The particle motion measurement Z corresponds to the vertical component (called "$V_z$" herein) of the particle velocity vector scaled with the obliquity factor, as described below:

$$Z = \frac{\rho f}{k_z} V_z,$$ Eq. 3 where "f" represents the frequency; "ρ" represents the density of the medium; and "$k_z$" represents the vertical wavenumber. The vertical wavenumber $k_z$ may be written as a function of the inline wavenumber $k_x$, crossline wavenumber $k_y$, acoustic speed c of sound in water and the frequency f, as set forth below:

$$k_z = \pm \frac{f}{c} \sqrt{1 - \frac{c^2}{f^2}(k_x^2 + k_y^2)}.$$ Eq. 4

In accordance with convention, the sign of the vertical wavenumber $k_z$ is positive for wavefields traveling in the direction from the sea floor to the sea surface. Otherwise, the sign of the vertical wavenumber $k_z$ is negative.

As can be appreciated by the skilled artisan, the measurement model that is set forth in Eqs. 1 and 2 may be extended to cases where the particle motion data are formed from any component of the particle velocity; particle acceleration or a variation thereof.

In the frequency wavenumber (f–k) domain, the downgoing wavefield D may be written in terms of the corresponding upgoing wavefield U by using the wavefield extrapolation operator (called "Ψ" herein) and the reflection coefficient (called "ϵ" herein) at the water-air interface:

$$D = \epsilon \Psi U = \epsilon e^{j4\pi k_z z} U,$$ Eq. 5 where "j" represents $\sqrt{-1}$; and "z" represents the cable depth. For a flat sea surface, the reflection coefficient ϵ may be approximated as $\epsilon \cong -1$.

By substituting the expression for the downgoing wavefield D set forth in Eq. 5 into Eqs. 1 and 2, the following expressions for the total pressure P and vertical component Z of the particle motion data may be derived as follows:

$$P = (1+\epsilon\psi)U + N_p = G_p U + N_p, \text{ and}$$ Eq. 6

$$Z = (1+\epsilon\psi)U + N_z = G_z U + N_z,$$ Eq. 7 where "$G_p$" and "$G_z$" represent the pressure and particle motion ghost operators, respectively.

In the deghosting problem, the objective is to estimate the upgoing wavefield U based on the total pressure and particle motion measurements. As mentioned above, the PZSUM algorithm is a model-independent deghosting method that estimates the upgoing wavefield as the average of the P and Z measurements:

$$U_{PZSUM} = \frac{P+Z}{2}.$$ Eq. 8

The advantage of the PZSUM algorithm is that it requires only a small subset of propagation parameters, namely the density of the medium and the acoustic speed of sound in water to determine the obliquity factor (see Eq. 3). However, the PZSUM algorithm ignores the noise statistics on pressure and particle motion measurements, which is usually unfavorable when one of the measurements is significantly noisier than the other measurement.

As mentioned above, the ODG method is a model-dependent deghosting algorithm that estimates the upgoing wavefield while minimizing the noise on the deghosted data. The ODG method achieves this by formulating the deghosting problem as a weighted least squares minimization problem. The upgoing wavefield U is determined by minimizing a cost function (called "J" herein), which is set forth below:

$$J = e^H C^{-1} e,$$ Eq. 9 where the vector "e" represents the difference between the measurement and the estimate of the measurement determined from an estimate of the upgoing wavefield (called "$U_{ODG}$"), as set forth below:

$$e = \begin{bmatrix} P - G_p U_{ODG} \\ Z - G_z U_{ODG} \end{bmatrix}.$$ Eq. 10

Also, in Eq. 9, "C" represents the covariance matrix of the measurement noise, which is described below:

$$C = \begin{bmatrix} \sigma_p^2 & \sigma_{pz} \\ \sigma_{zp} & \sigma_z^2 \end{bmatrix},$$ Eq. 11 where "σ" represents the standard deviation of the noise, and the subscripts refer to the particular type of noise. The leading diagonal entries in the covariance matrix C represent the variances of the noise on pressure and particle motion; and the off-diagonal entries represent the cross-correlation between these noises. The ODG deghosting algorithm minimizes the least-squares cost function J, resulting in the upgoing wavefield estimate $U_{ODG}$, which is set forth below:

$$U_{ODG} = \frac{\frac{G_p^* P}{\sigma_p^2} + \frac{G_z^* Z}{\sigma_z^2} - \frac{\sigma_{pz} G_z^* P + \sigma_{zp} G_p^* Z}{\sigma_p^2 \sigma_z^2}}{\frac{|G_p|^2}{\sigma_p^2} + \frac{|G_z|^2}{\sigma_z^2} - \frac{G_z^* G_p \sigma_{pz} + \sigma_{zp} G_p^* G_z}{\sigma_p^2 \sigma_z^2}},$$ Eq. 12 where "*" represents the conjugation operator.

In the special case of uncorrelated pressure and particle motion noises, the upgoing wavefield estimate $U_{ODG}$ may be simplified as follows:

$$U_{ODG} = \frac{\frac{G_p^* P}{\sigma_p^2} + \frac{G_z^* Z}{\sigma_z^2}}{\frac{|G_p|^2}{\sigma_p^2} + \frac{|G_z|^2}{\sigma_z^2}}.$$ Eq. 13

When the noise levels on pressure and particle motion measurements are the same, the noise variances in Eq. 13 cancel, the denominator simplifies to 4 (assuming that the reflection coefficient is −1), and the upgoing wavefield $U_{ODG}$ is the same estimate as provided by the dephase and sum deghosting algorithm (herein called the "DPS" deghosting algorithm), another model-dependent deghosting algorithm (see Eq. 9). The DPS deghosting algorithm is generally disclosed in Posthumus, B. J., "Deghosting Using a Twin Streamer Configuration," Geophysical Prospecting, vol. 41, pp. 267-286 (1993).

The DPS deghosting algorithm accommodates disparate noise levels in the pressure and particle motion measurements. More specifically, the DPS technique estimates the upgoing wavefield by first filtering the pressure and particle motion measurements with the conjugate of the respective ghost filters to remove the phase effect of the ghost and then sums the dephased data, as set forth below:

$$U_{DPS} = \frac{G_p^* P + G_z^* Z}{4}.\qquad\text{Eq. 14}$$

Because the DPS algorithm relies on a ghost model, the DPS algorithm reduces the noise on deghosted data as compared to PZSUM algorithm. However, the treatment of the noise is suboptimal when noise levels on the two measurements are different.

Both the ODG and DPS deghosting algorithms are ghost model dependent and each requires the measurement of physical parameters, such as the reflection coefficient between the air-water interface, the density of the medium and the streamer cable depth. When the underlying ghost model is correct, the ODG deghosting algorithm minimizes the deghosting noise, and the DPS deghosting algorithm provides deghosted data with a higher noise level than the ODG solution but with lower noise level than the PZSUM deghosting algorithm.

It is possible that the ghost model may not exactly match the actual physical model. For small to medium deviations, the model-dependent solutions may be robust at relatively low frequencies. However, at higher frequencies, the estimates that are provided by ghost model-dependent solutions may introduce a significant degree of bias to the estimate of the upgoing wavefield U. As an example, when the upgoing wavefield estimate $U_{DPS}$ is determined at a depth $\tilde{z}$, which differs from the actual streamer cable depth by an amount of $\Delta z$, then the corresponding estimate of the upgoing wavefield (called "$\tilde{U}_{DPS}$" herein) becomes the following:

$$\tilde{U}_{DPS} = \tilde{T}U + \frac{\tilde{G}_p^* N_p + \tilde{G}_z^* N_z}{4},\qquad\text{Eq. 15}$$

where "$\tilde{G}_p$" represents the pressure ghost model determined at an incorrect cable depth $\tilde{z}$; "$\tilde{G}_z$" represents the particle motion ghost model determined at the incorrect cable depth $\tilde{z}$; and $\tilde{T}$ represents the distortion on the estimate of the upgoing wavefield, as described below:

$$\tilde{T} = e^{j2\pi k_z \Delta z} \cos(2\pi k_z \Delta z).\qquad\text{Eq. 16}$$

Figure 4:
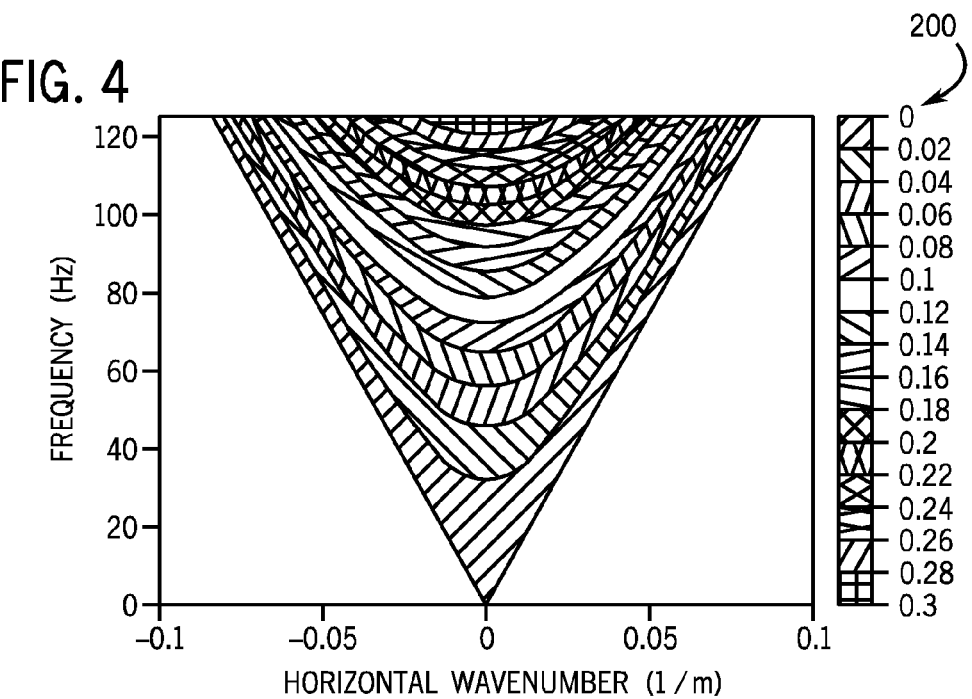
FIG. 4 illustrates a distortion introduced by a model-dependent deghosting algorithm according to an embodiment of the invention.

As an example for comparison, FIG. 4 depicts a simulated illustration 200 of the distortion function corresponding to 50 centimeters (cm) depth error. At 120 Hertz (Hz) and vertical incidence (zero wavenumber), the magnitude of the distortion $\tilde{T}$ is around 0.3 decibels (dB), or 3.4%.

In the following discussion, it is assumed that the model parameters used for deghosting deviate from the true physical parameters. Disclosed herein are techniques that characterize the errors in the ghost model and estimate the upgoing wavefield by jointly minimizing errors due to measurement noise and ghost model errors.

More specifically, assume that an incorrect measurement of the streamer cable depth has been made, and also an in incorrect measurement of the reflection coefficient has been made. These errors affect the amplitude and the phase of the wavefield extrapolator operator ψ and result in the corresponding ghost functions $\tilde{G}_p$ (for pressure) and $\tilde{G}_z$ (for particle motion), as described below in terms of an extrapolation model error called "$\Delta\Psi$":

$$\tilde{G}_p = G_p - \Delta\psi, \text{ and}\qquad\text{Eq. 17}$$

$$\tilde{G}_z{}^\% = G_z + DY.\qquad\text{Eq. 18}$$

The measurement model that is set forth in Eqs. 6 and 7 may be modified to express the total pressure and particle motion data measurements in terms of the incorrect ghost models and noise terms, which are combinations of measurement noises and model errors, as described below:

$$P = \tilde{G}_p U + \tilde{N}_p, \text{ and}\qquad\text{Eq. 19}$$

$$Z = \tilde{G}_z U + \tilde{N}_z,\qquad\text{Eq. 20}$$

where "$\tilde{N}_p$" represents an aggregate pressure measurement error; and "$\tilde{N}_z$" represents an aggregate particle motion error. The $\tilde{N}_p$ and $\tilde{N}_z$ errors may be expressed as follows:

$$\tilde{N}_p = \Delta\Psi U + \tilde{N}_p, \text{ and}\qquad\text{Eq. 21}$$

$$N_z{}^\% = DYU + N_z{}^\%,\qquad\text{Eq. 22}$$

where "$\Delta\Psi U$" represents a signal-dependent noise due to errors in the ghost model. When the ghost model is correct, the $\Delta\Psi U$ term is zero. If the assumed and actual streamer cable depths are represented by $z_m$ and $z_m + \Delta z$, respectively, and the assumed and actual reflection coefficient magnitudes at the water-air interface are represented by 1 and $1+\Delta\epsilon$, respectively, the $\Delta\Psi U$ signal-dependent noise term becomes the following:

$$\Delta\Psi U = [e^{j4\pi k_z z_m} - (1+\Delta\epsilon)e^{j4\pi k_z(z_m+\Delta z)}]U.\qquad\text{Eq. 23}$$

Although the measurement noises on pressure P and particle motion Z data may be uncorrelated, the $\tilde{N}_p$ and $\tilde{N}_z$ noise terms are correlated by the common, erroneous extrapolation model.

The upgoing wavefield may be estimated (i.e., giving rise to an estimate called "$\tilde{U}$") through the use of a linear estimator that combines the total pressure P and particle motion Z measurements, as set forth below:

$$\tilde{U} = \alpha P + \beta Z,\qquad\text{Eq. 24}$$

where "α" and "β" represent the combination weights for the total pressure P and particle motion Z measurements, respectively. By substituting Eqs. 19, 20, 21 and 22 into Eq. 24, the upgoing wavefield estimate $\tilde{U}$ may be described as follows:

$$\tilde{U} = (\alpha\tilde{G}_p + \beta\tilde{G}_z)U + (\beta-\alpha)\Delta\Psi U + (\alpha N_p + \beta N_z).\qquad\text{Eq. 25}$$

In Eq. 25, the first term represents the estimate of the upgoing wavefield based on the incorrect ghost model; the second term represents the (signal-dependent) bias in the estimate; and the third term represents the (signal-independent) noise on the deghosted data due to measurement noises on pressure and particle motion data. A constraint may be imposed that the first term is exactly equal to the upgoing wavefield, which may be achieved through the following relationship:

$$\alpha\tilde{G}_p + \beta\tilde{G}_z = 1.\qquad\text{Eq. 26}$$

Under this constraint, the estimate of the upgoing wavefield $\tilde{U}$ becomes the following:

$$\tilde{U} = U + (\beta-\alpha)\Delta\Psi U + (\alpha N_p + \beta N_z).\qquad\text{Eq. 27}$$

The combination weights α and β may be determined by minimizing a weighted energy of the bias and noise terms in Eq. 27. To achieve this, a cost function (called "J" herein), such as the following, may be defined:

$$\tilde{J} = \lambda E[|(\beta-\alpha)\Delta\Psi U|^2] + E[|\alpha N_p + \beta N_z|^2],\qquad\text{Eq. 28}$$

where "E[ ]" represents the statistical expectation operation; and "λ" represents a weight that determines the relative contribution of the bias and noise on the deghosted data to the cost function $\tilde{J}$. The selection of the λ weight depends on the particular application. For example, if errors due to bias and measurement noise are treated similarly, then the λ weight is chosen to be 1. As another example, if the signal-dependent bias is less preferable, as compared to the impact of the measurement noise, then the λ weight is chosen to be greater than 1. In accordance with other embodiments of the invention, the λ weight may be frequency and/or wavenumber dependent. Thus, many variations are contemplated and are within the scope of the appended claims.

The minimization of the cost function $\tilde{J}$ under the constraint described in Eq. 26 produces the following solution for the combination weights α and β:

$$\alpha = \frac{2\lambda\sigma_d^2 + \sigma_z^2 \tilde{G}_p^* - \sigma_{zp}\tilde{G}_z^*}{D}, \text{ and} \qquad \text{Eq. 29}$$

$$\beta = \frac{2\lambda\sigma_d^2 + \sigma_p^2 \tilde{G}_z^* - \sigma_{pz}\tilde{G}_p^*}{D}. \qquad \text{Eq. 30}$$

Moreover, the downgoing wavefield may be described as follows:

$$D = 4\lambda\sigma_d^2 + \sigma_z^2|\tilde{G}_p|^2 + \sigma_p^2|\tilde{G}_z|^2 - \sigma_{zp}\tilde{G}_z^*G_p - \sigma_{pz}\tilde{G}_p^*G_z. \qquad \text{Eq. 31}$$

In Eqs. 29, 30 and 31, "$\sigma_d^2$" represents the expected energy of the unexplained part of the signal due to incorrect ghost model, i.e., the ΔΨU component. As an example, when the depth error is modeled as a normal distribution with variance $\sigma_{\Delta z}^2$, then the variance of this model-dependent error may be expressed as follows:

$$\sigma_d^2 = (1 + \mu_{\Delta\epsilon} + \sigma_{\Delta\epsilon}^2)(1 - \exp(-64\pi^2 k_z^2 \sigma_{\Delta z}^2))\sigma_u^2, \qquad \text{Eq. 32}$$

where "$\sigma_u^2$" represents the expected signal level; "$\mu_{\Delta\epsilon}$" represents the mean; and "$\sigma_{\Delta\epsilon}^2$" represents the variance of the deviation of the reflection coefficient magnitude about the nominal value of 1. The expected signal level (called "$\sigma_u^2$") may be approximated by using a source ghost model and the air gun signature.

Substituting the estimated weights into Eq. 24 gives rise to the following description of the upgoing wavefield estimate $\tilde{U}$:

$$\tilde{U} = \frac{2\lambda\frac{\sigma_d^2}{\sigma_z^2\sigma_p^2}(P+Z) + \frac{\tilde{G}_p^* P}{\sigma_p^2} + \frac{\tilde{G}_z^* Z}{\sigma_z^2} - \frac{\sigma_{zp}\tilde{G}_z^* P + \sigma_{pz}\tilde{G}_p^* Z}{\sigma_p^2\sigma_z^2}}{4\lambda\frac{\sigma_d^2}{\sigma_z^2\sigma_p^2} + \frac{|\tilde{G}_p|^2}{\sigma_p^2} + \frac{|\tilde{G}_z|^2}{\sigma_z^2} - \frac{\sigma_{zp}\tilde{G}_z^* G_p + \sigma_{pz}\tilde{G}_p^* G_z}{\sigma_p^2\sigma_z^2}}. \qquad \text{Eq. 33}$$

A special case is when the measurement noises on the pressure and particle motion sensors are uncorrelated. For this case, the upgoing wavefield estimate $\tilde{U}$ simplifies to the following:

$$\tilde{U} = \frac{2\lambda\frac{\sigma_d^2}{\sigma_p^2\sigma_z^2}(P+Z) + \frac{\tilde{G}_p^* P}{\sigma_p^2} + \frac{\tilde{G}_z^* Z}{\sigma_z^2}}{4\lambda\frac{\sigma_d^2}{\sigma_p^2\sigma_z^2} + \frac{|\tilde{G}_p|^2}{\sigma_p^2} + \frac{|\tilde{G}_z|^2}{\sigma_z^2}}. \qquad \text{Eq. 34}$$

In a more compact form, the upgoing wavefield estimate $\tilde{U}$ may be described as follows:

$$\tilde{U} = K\tilde{U}_{ODG} + (1-K)U_{SUM}, \qquad \text{Eq. 35}$$

where "$\tilde{U}_{ODG}$" represents the estimate of the upgoing wavefield when the ODG algorithm is used with the incorrect ghost model and may be described as follows:

$$\tilde{U}_{ODG} = \frac{\tilde{G}_p^* P/\sigma_p^2 + \tilde{G}_z^* Z/\sigma_z^2}{|\tilde{G}_p|^2/\sigma_p^2 + |\tilde{G}_z|^2/\sigma_z^2}. \qquad \text{Eq. 36}$$

Also, in Eq. 35, "$U_{SUM}$" represents the estimate of the upgoing wavefield when the PZSUM algorithm is used and is described below:

$$U_{SUM} = \frac{P+Z}{2}, \qquad \text{Eq. 37}$$

The term "K" in Eq. 35 is a function of the incorrect ghost models, the measurement noise variances and the expected signal distortion when the incorrect ghost models are used:

$$K = \frac{\frac{|\tilde{G}_p|^2}{\sigma_p^2} + \frac{|\tilde{G}_z|^2}{\sigma_z^2}}{4\lambda\frac{\sigma_d^2}{\sigma_p^2\sigma_z^2} + \frac{|\tilde{G}_p|^2}{\sigma_p^2} + \frac{|\tilde{G}_z|^2}{\sigma_z^2}}. \qquad \text{Eq. 38}$$

As an example, if the weighting function is chosen as $\lambda = \sqrt{f}$ to penalize the signal distortion at higher frequencies, the cable depth is 20 meters (m); the standard deviation of the depth measurement error is 0.3 m; the acoustic speed of sound in water is 1500 meters per second (m/s); and $\mu_{\Delta\epsilon} + \sigma_{\Delta\epsilon}^2 \ll \sigma_{\Delta z}^2$, then the term K may be described as follows at vertical incidence (i.e., $k_z = f/c$):

$$K = \frac{(\sigma_p^2 + \sigma_z^2) + (\sigma_p^2 - \sigma_z^2)\cos(4\pi f/75)}{2\sqrt{f}(1 - \exp(-\pi^2 f^2/625^2))\sigma_u^2 + (\sigma_p^2 + \sigma_z^2) + (\sigma_p^2 - \sigma_z^2)\cos(4\pi f/75)}. \qquad \text{Eq. 39}$$

Figure 5:
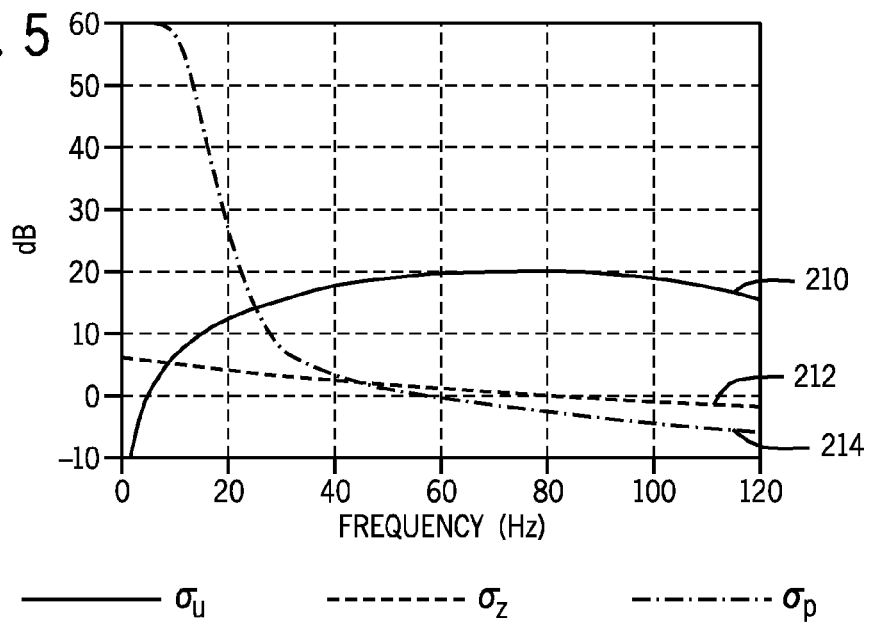
FIG. 5 illustrates synthetically-generated pressure and particle motion noise levels according to an example.

FIG. 5 depicts arbitrary but quite general synthetically-generated pressure ("$\sigma_p$") 212 and particle motion ("$\sigma_z$") 214 noise levels. The expected signal level ($\sigma_u$ 210) was chosen by assuming that the source depth was 5 m and the source signature spectrum was flat.

Figure 6:
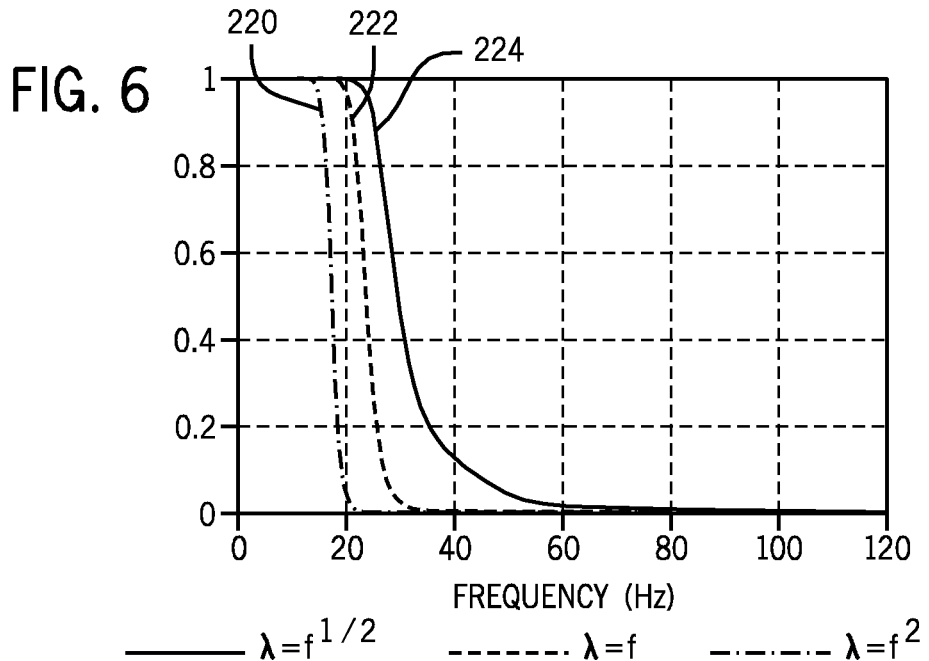
FIG. 6 illustrates a weighting parameter according to different examples.

FIG. 6 depicts the variation of the K parameter as a function of frequency for three different selections of the weighting parameter λ. In particular, FIG. 6 depicts a first curve 224 for the K parameter where the weighting parameter λ is the square root frequency, curve 222 depicts the K parameter for when λ is set equal to frequency, and curve 220 depicts the K parameter for when λ is equal to the square of the frequency. As shown, when the signal distortion at higher frequencies is more heavily penalized (such as depicted by curve 220), the transition between the ODG solution to PZSUM solution is sharper.

Figure 7:
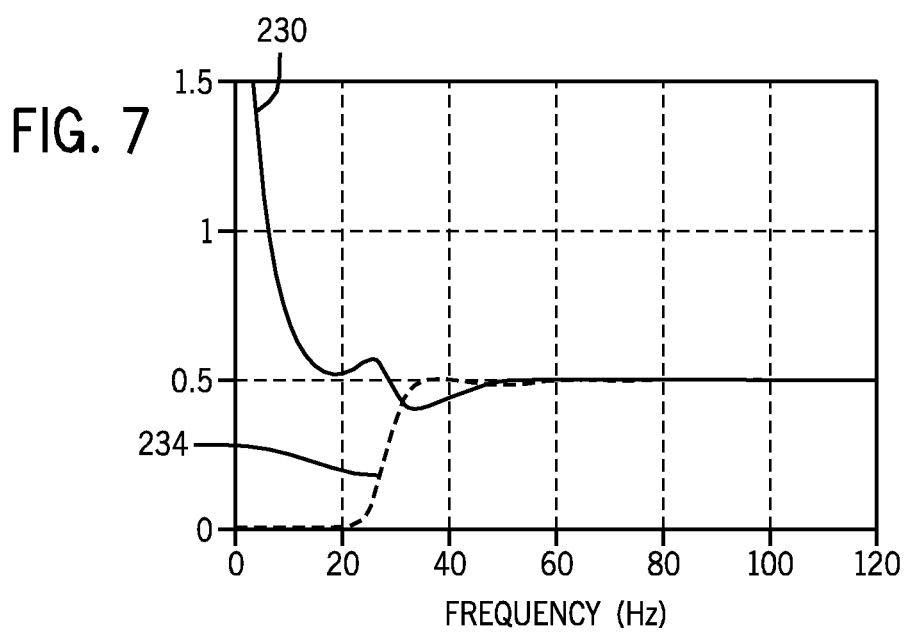
FIG. 7 illustrates weights applied to pressure and particle motion measurements to determine an upgoing wavefield according to an embodiment of the invention.

FIG. 7 depicts the magnitude of the weights of the pressure and particle motion measurements to determine the upgoing wavefield estimates. The value of the weighting parameter was chosen as $\lambda = \sqrt{f}$ for this example. In particular, FIG. 7 depicts a curve 230 depicting the weighting assigned to the estimate provided by the ODG algorithm; and a curve 234 depicting the weighting assigned to the estimate provided by the PZSUM algorithm. At lower frequencies, the pressure and particle motion data combination of weights are close to the one given by the ODG deghosting algorithm; and at higher frequencies, the weights are close to the one assigned by the PZSUM deghosting algorithm. This way, the techniques that are disclosed herein take advantage of the ODG deghosting algorithms at frequencies where the two datasets have disparate noise levels and take advantage of the PZSUM deghosting algorithm at frequencies where the two datasets have comparable noise levels.

Figure 3:
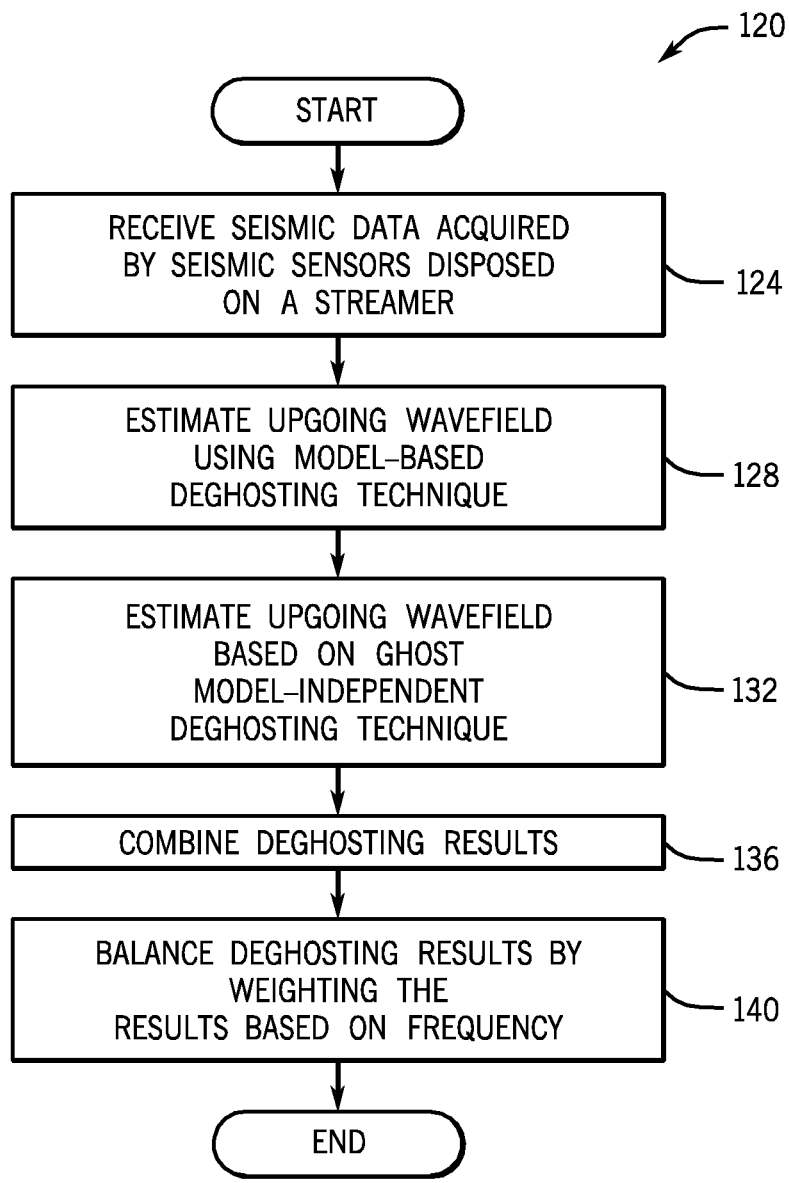

Thus, referring to FIG. 3, to summarize, a technique 120 disclosed herein includes receiving (block 124) seismic data (i.e., data indicative of particle motion measurements and pressure measurements) acquired by sensors on at least one seismic streamer. Pursuant to the technique 120, a first estimate of an upgoing wavefield is determined using a model-based deghosting technique, pursuant to block 128; and a second estimate of the upgoing wavefield is determined using a ghost model-independent deghosting technique, pursuant to block 132. The two estimates of the upgoing wavefield are combined (block 136); and the contributions of these estimates are selectively balanced (block 140) by weighting the estimates based on frequency and/or wavenumber.

Figure 8:
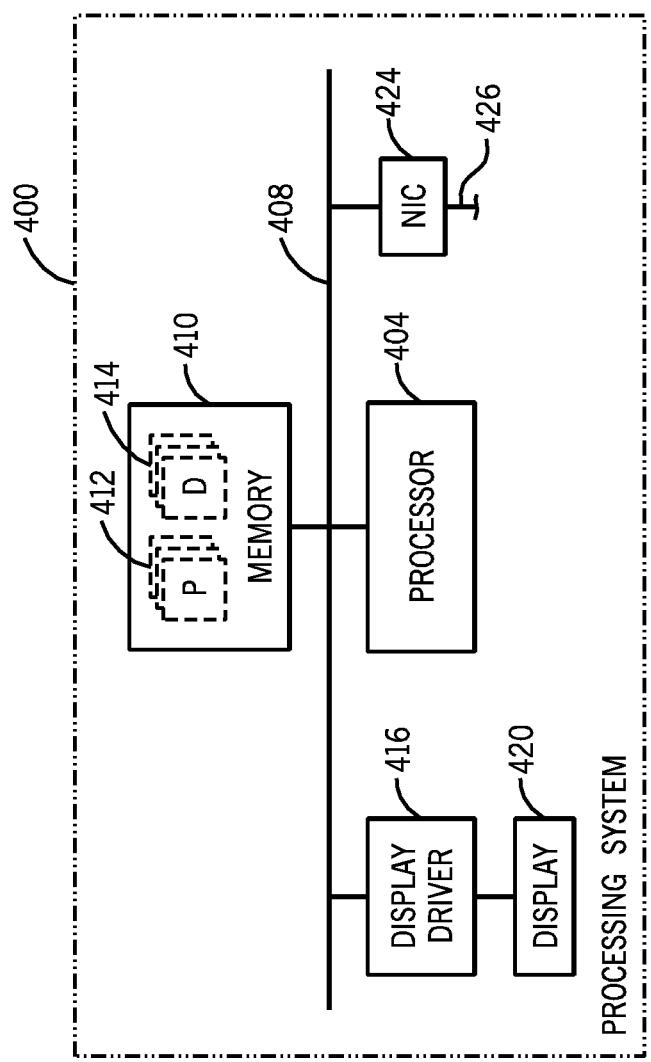
FIG. 8 is a schematic diagram of a data processing system according to an embodiment of the invention.

Referring to FIG. 8, in accordance with some embodiments of the invention, a data processing system 400 may be used for purposes of processing pressure and particle motion data to deghost the data, as described herein. The data processing system 400 may be part of the signal processing unit 23 (see FIG. 1) in some implementations. It is noted that the architecture of the processing system 400 is illustrated merely as an example, as the skilled artisan would recognize many variations and deviations therefrom. For example, in some embodiments of the invention, the processing system may be a distributed system that is located at different local and/or remote locations. All or part of the data processing system may be disposed on the vessel 20, on a streamer 30, on a platform, at a remote processing facility, etc., depending on the particular embodiment of the invention.

In the example that is depicted in FIG. 8, the data processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to perform all or parts of the techniques 100 and/or 120, which are disclosed herein, as well as other techniques that deghost seismic data using a combination of ghost model-dependent and ghost model-independent deghosting algorithms, in accordance with the many possible implementations of the invention.

The memory 410 may also store datasets 414 which may be initial, intermediate and/or final datasets produced by the processing by the processor 404. For example, the datasets 414 may include data indicative of seismic data, pressure measurements, particle motion measurements, ghost operator parameters, upgoing wavefield estimates derived from the different deghosting algorithms; propagation parameters; weighting coefficients; parameters modeling ghost model errors; parameters modeling sensor noise; etc.

As depicted in FIG. 8, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving such data as particle motion data, specification thresholds, model parameters, etc. As also depicted in FIG. 8, a display 420 of the processing system 408 may display initial, intermediate or final results produced by the processing system 400. In general, the display 420 may be coupled to the system 400 by a display driver 416. As a non-limiting example, the display 420 may display an image, which graphically depicts pressure sensor noise levels; particle motion sensor noise levels; estimated upgoing wavefields; model-induced distortion; weighting parameters versus frequency; etc.

Other embodiments of the invention are within the scope of the appended claims. For example, the seismic sensors may be disposed on an acquisition platform other than a streamer, in accordance with other embodiments of the invention. As non-limiting alternative examples, the seismic sensors may be deployed on a seabed cable, a tethered cable, inside a submersible vehicle, etc., depending on the particular implementation.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving seismic data acquired by seismic sensors; and
   processing the seismic data on a machine to deghost the data, comprising:
      deghosting the seismic data using a first deghosting technique that relies on a ghost model;
      deghosting the seismic data using a second deghosting technique that is independent from any modeling of the ghost; and
      selectively combining the results of the deghosting using the first and second deghosting techniques.

2. The method of claim 1 wherein the seismic sensors are disposed on a towed streamer, a stationary cable or inside a submersible vehicle.

3. The method of claim 1, wherein the act of selectively combining comprises:
   applying a first weight to the result of the deghosting applying the first deghosting technique to derive a first weighted result;
   applying a second weight to the result of the deghosting applying the second deghosting technique to derive a second weighted result; and
   selectively combining the first and second weighted results.

4. The method of claim 3, wherein the act of selectively combining the first and second weights comprises:
   selectively combining the first and second weighted results based at least in part on one of at least a frequency and wavenumber of the seismic data.

5. The method of claim 3, wherein the act of selectively combining the first and second weights comprises:
   weighting the result of the deghosting applying the first deghosting technique more than the result of the deghosting applying the second technique when the expected noise introduced by the seismic sensors is relatively high; and
   weighting the result of the deghosting applying the first deghosting technique less than the result of the deghosting applying the second technique when the expected noise introduced by the seismic sensors is relatively low.

6. The method of claim 1, wherein
the seismic data comprise first data indicative of particle motion measurements and second data indicative of pressure measurements; and
the act of deghosting using the first deghosting technique comprises averaging the particle motion measurements with the pressure measurements.

7. The method of claim 1, wherein
the seismic data comprise first data indicative of particle motion measurements and second data indicative of pressure measurements; and
the act of deghosting using the second deghosting technique comprises minimizing a cost function that is a function of the particle motion and pressure measurements, and estimates of the measurements derived by applying ghost operators to estimates of upgoing particle motion and pressure wavefields.

8. The method of claim 7, wherein the act of deghosting using the second deghosting technique comprises using statistics of pressure and particle motion noises.

9. A system comprising:
an interface to receive seismic data acquired by seismic sensors; and
a processor to:
deghost the seismic data using a first deghosting technique that relies on a ghost model;
deghost the seismic data using a second deghosting technique that is independent from any modeling of the ghost; and
selectively combine the results of the deghosting using the first and second deghosting techniques.

10. The system of claim 9, further comprising:
an acquisition platform containing the seismic sensors, the platform comprising a streamer, a seabed cable or a submersible vehicle.

11. The system of claim 9, wherein the processor is adapted to:
apply a first weight to the result of the deghosting applying the first deghosting technique to derive a first weighted result;
apply a second weight to the result of the deghosting applying the second deghosting technique to derive a second weighted result; and
selectively combine the first and second weighted results.

12. The system of claim 11, wherein the processor is adapted to:
selectively combine the first and second weighted results based at least in part on at least one of a frequency and wavenumber of the seismic data.

13. The system of claim 9, wherein the processor is adapted to:
weight the result of the deghosting applying the first deghosting technique more than the result of the deghosting applying the second technique when the expected noise introduced by the seismic sensors is relatively high; and
weight the result of the deghosting applying the first deghosting technique less than the result of the deghosting applying the second technique when the expected noise introduced by the seismic sensors is relatively low.

14. The system of claim 9, wherein
the seismic data comprise first data indicative of particle motion measurements and second data indicative of pressure measurements; and
the processor is adapted to average the particle motion measurements with the pressure measurements to deghost the seismic data using the first deghosting technique.

15. The system of claim 9, wherein
the seismic data comprise first data indicative of particle motion measurements and second data indicative of pressure measurements; and
the processor is adapted to minimize a cost function that is a function of the particle motion and pressure measurements, and estimates of the measurements derived by applying ghost operators to estimates of upgoing particle motion and pressure wavefields.

16. The system of claim 15, wherein processor is further adapted to use statistics of pressure and particle motion noises to selectively combine the results.

17. An article comprising a computer readable storage medium to store instructions that when executed by a computer cause the computer to:
receive seismic data acquired by seismic sensors;
deghost the seismic data using a first deghosting technique that relies on a ghost model;
deghost the seismic data using a second deghosting technique that is independent from any modeling of the ghost; and
selectively combine the results of the deghosting using the first and second deghosting techniques.

18. The article of claim 17, the storage medium storing instructions that when executed by the computer cause the computer to:
apply a first weight to the result of the deghosting applying the first deghosting technique to derive a first weighted result;
apply a second weight to the result of the deghosting applying the second deghosting technique to derive a second weighted result; and
selectively combine the first and second weighted results.

19. The article of claim 17, the storage medium storing instructions that when executed by the computer cause the computer to selectively combine the first and second weighted results based at least in part on at least one estimate of a frequency and wavenumber component of the seismic data.

20. The article of claim 17, the storage medium storing instructions that when executed by the computer cause the computer to:
weight the result of the deghosting applying the first deghosting technique more than the result of the deghosting applying the second technique when the expected noise introduced by the seismic sensors is relatively high; and
weight the result of the deghosting applying the first deghosting technique less than the result of the deghosting applying the second technique when the expected noise introduced by the seismic sensors is relatively low.

21. The article of claim 17, wherein
the seismic data comprise first data indicative of particle motion measurements and second data indicative of pressure measurements; and
the storage medium storing instructions that when executed by the computer cause the computer to average the particle motion measurements with the pressure measurements to deghost the seismic data using the first deghosting technique.

22. The article of claim 17, wherein
the seismic data comprise first data indicative of particle motion measurements and second data indicative of pressure measurements; and
the storage medium storing instructions that when executed by the computer cause the computer to minimize a cost function that is a function of the particle motion and pressure measurements, and estimates of the measurements derived by applying ghost operators to estimates of upgoing particle motion and pressure wavefields.

23. The article of claim 17, the storage medium storing instructions that when executed by the computer cause the computer to use statistics of pressure and particle motion noises to selectively combine the results.

* * * * *